(12) United States Patent
Wang (10) Patent No.: US 9,402,176 B2
(45) Date of Patent: Jul. 26, 2016

(54) METHOD, SYSTEM AND DEVICE FOR TRANSMITTING DATA

(75) Inventor: Hucheng Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/345,232

(22) PCT Filed: Aug. 13, 2012

(86) PCT No.: PCT/CN2012/080000
§ 371 (c)(1),
(2), (4) Date: Oct. 10, 2014

(87) PCT Pub. No.: WO2013/037255
PCT Pub. Date: Mar. 21, 2013

(65) Prior Publication Data
US 2015/0071169 A1 Mar. 12, 2015

(30) Foreign Application Priority Data
Sep. 15, 2011 (CN) .......................... 2011 1 0274230

(51) Int. Cl.
H04W 8/26 (2009.01)
H04W 76/02 (2009.01)
H04W 8/02 (2009.01)
H04W 88/00 (2009.01)

(52) U.S. Cl.
CPC ........ *H04W 8/26* (2013.01); *H04W 8/02* (2013.01); *H04W 76/02* (2013.01); *H04W 76/022* (2013.01); *H04W 88/005* (2013.01)

(58) Field of Classification Search
CPC ... H04W 76/022; H04W 24/08; H04W 4/005; H04W 72/042; H04W 76/06; H04W 76/068; H04W 76/02; H04L 5/0094; H04L 65/1006
See application file for complete search history.

(56) References Cited

U.S. PATENT DOCUMENTS 9,191,178 B2 * 11/2015 Koc ................. H04W 76/00
2010/0232393 A1 9/2010 Shuai et al.
(Continued)

FOREIGN PATENT DOCUMENTS

CN 1668024 A 9/2005
CN 101557610 A 10/2009
(Continued)

OTHER PUBLICATIONS

3GPP, Technical Specification Group Services and System Aspects; System Improvements for Machine-Type Communications; (Release 11), 3GPP Standard; 3GPP TR 23.888. 3rd Generation Partnership Project (3GPP). Mobile Competence Centre. 650. Route Des Lucioles • F-06921 Sophia-Antipolis Cedex• France.vol. SA WG2. No. VI.4.0.5 Aug. 2011 (Aug. 5, 2011).*
(Continued)

*Primary Examiner* — Mounir Moutaouakil
(74) *Attorney, Agent, or Firm* — Blakely, Sokoloff, Taylor & Zafman LLP (57) ABSTRACT

The invention embodiments disclose a method, system and device for transmitting data, relate to wireless communication technical art, and resolve the question that terminal how to transmit data when packet data network (PDN) connection is not be established. In the invention, when the terminal needs to transmit data and the PDN connection for transmitting the data is not be established, the terminal sends data transmitting message which carries a PDN connection request message and package to be transmitted to mobility management entity (MME). The PDN connection is only established by core network side when the MME receives the data transmitting message, and the package to be transmitted is sent out by the PDN connection. Therefore, the invention enables UE to transmit data when PDN connection is not be established.

15 Claims, 4 Drawing Sheets

(56) References Cited

U.S. PATENT DOCUMENTS

2011/0199905 A1    8/2011    Pinheiro et al.
2012/0282956 A1   11/2012   Kim et al.
2013/0272256 A1* 10/2013   Mihaly et al. ................. 370/329

FOREIGN PATENT DOCUMENTS

| CN | 101720090 A | | 6/2010 |
|---|---|---|---|
| CN | 101741822 A | | 6/2010 |
| CN | 101931898 A | | 12/2010 |
| CN | 101998331 A | | 3/2011 |
| CN | 102026241 A | | 4/2011 |
| CN | 102026403 A | | 4/2011 |
| CN | 102316521 A | | 1/2012 |
| GB | 2502034 A | * | 7/2011 |
| WO | WO 2011/099821 A2 | | 8/2011 |
| WO | WO 2011099821 A3 | * | 1/2012 |

OTHER PUBLICATIONS

KPN: "Key Issue—Offline Small Data 1-15 Transmission". Feb. 16, 2010. 3GPP Draft; S2-101453 S2 78 TD Key Issue—Offline Small Data Transmission. 3rd Generation Partnership Project (3GPP). Mobile Competence Centre • 650. Route Des Lucioles • F-06921 Sophia-Antipolis Cedex • France. XP050433965.*

PCT International Search Report for PCT Counterpart Application No. PCT/CN2012/080000, 5 pgs., (Nov. 15, 2012).
PCT Written Opinion of the International Searching Authority for PCT Counterpart Application No. PCT/CN2012/080000, 10 pgs., (Nov. 15, 2012).
ZTE, "NAS PDU based Small Data Transmission", SA WG2 Temporary Document, SA WG2 Meeting #86, S2-113083, Naantali, Finland, 4 pgs., (Jul. 11-15, 2011).
International Preliminary Report on Patentability, Chapter I for PCT Application No. PCT/CN2012/080000; 9pgs. (Mar. 18, 2014).
3GPP; Technical Specification Group Services and System Aspects; Service requirements for Machine-Type Communications (MTC); Stage 1 (Release 11); 3GPP TS 22.368 v11.2.0 (Jun. 2011); 25pgs.
3GPP; Technical Specification Group Services and System Aspects; General Packet Radio Service (GPRS) enhancements for Evolved Universal Terrestrial Radio Access Network (E-UTRAN) access (Release 10); 3GPP TS 23.401 v10.4.0 (Jun. 2011); 281pgs.
European Patent Office Communication enclosing Extended European Search Report for corresponding European Patent Application No. 12831152.9, 6 pp., (Mar. 3, 2015).
KPN, "Key Issue—Offline Small Data Transmission", SA WG2 Temporary Document, 3GPP TSG SA WG2 Meeting #78, TD S2-101453, San Francisco, USA, 3 pp., (Feb. 22-26, 2010).
European Patent Office Communication enclosing Office Action for corresponding European Patent Application No. 12831152.9, 5 pages, (Mar. 2, 2016).

* cited by examiner

METHOD, SYSTEM AND DEVICE FOR TRANSMITTING DATA

CROSS-REFERENCE TO RELATED APPLICATIONS

The present application is a U.S. National Stage under 35 U.S.C. §371 of International Application No. PCT/CN2012/080000, filed on Aug. 13, 2012, entitled METHOD, SYSTEM AND DEVICE FOR TRANSMITTING DATA, designating the United States, and claiming priority to Chinese Patent Application No. 201110274230.3, filed with the State Intellectual Property Office of PRC on Sep. 15, 2011 and entitled "Data transmission method, system and apparatus", the contents of which were incorporated by reference in their entirety.

FIELD

The present invention relates to the field of wireless communications and particularly to a data transmission method, system and apparatus.

BACKGROUND

The small data transfer feature is an important demand in the technology of machine type communication and intended to lower consumption of network signaling and a bearer resource due to small data transmission. Accordingly, the Third Generation Partnership Project (3GPP) network is desired to be optimized for this feature, and in view of this, the following demands are proposed in the protocol TS22.368.

The small data transfer feature is applicable to a Machine Type Communication (MTC) device sending or receiving a small amount of data. For the small data transfer feature:

First the system shall support small data transmission with minimized influence on the network (e.g., a signaling overhead, a network resource, a reconfiguration delay);

Second the MTC devices with a small amount of data to be sent may be attached to the network or detached from the network; and Third the definition of a small amount of data may be configured based upon subscription information or a policy of an operator.

Figure 1:
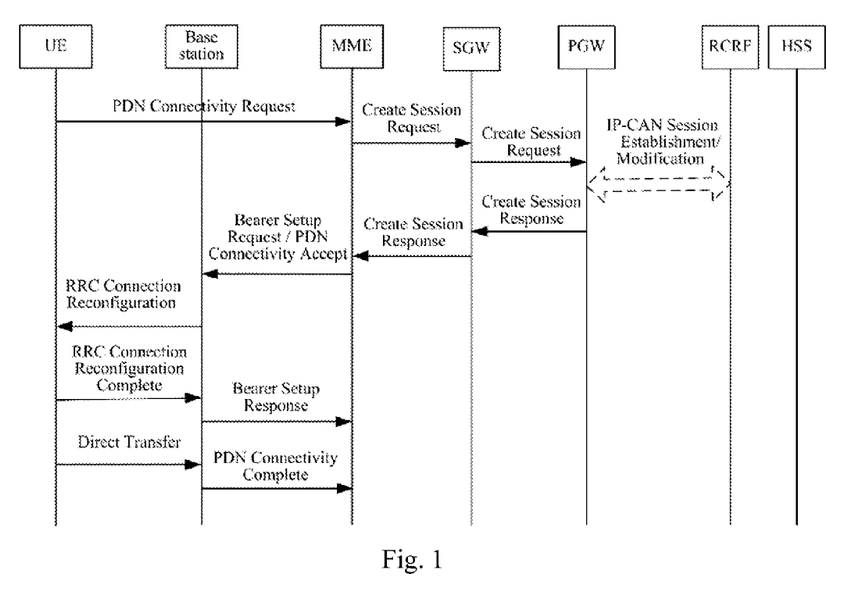
FIG. 1 is a schematic diagram of a procedure of establishing a PDN connection in the prior art.

The inventors have identified during making of this application the following technical problem in the prior art:

In the prior art, a User Equipment (UE) has to firstly establish a Packet Data Network (PDN) connection prior to transmission of data and then transmit the data over the PDN connection, and it has been a problem to be addressed of how to transmit data when the UE has not established a PDN connection. A procedure of establishing a PDN connection is as illustrated in FIG. 1, and reference can be made to the description of the protocol TS 23.401 for a particular implementation thereof.

SUMMARY

Embodiments of this application provide a data transmission method, system and apparatus so as to address the problem of how to transmit data when a UE has not established a PDN connection.

A data transmission method includes:

a user equipment with data to be transmitted determining whether there is a Packet Data Network, PDN, connection established for transmitting the data; and the user equipment sending to a Mobility Management Entity, MME, a data transmission message carrying a PDN Connectivity Request message and a data packet to be transmitted after determining that there is no PDN connection established for transmitting the data.

A data transmission method includes:

a Mobility Management Entity, MME, receiving a data transmission message, sent from a user equipment, carrying a Packet Data Network, PDN, Connectivity Request message and a data packet to be transmitted;

the MME establishing a PDN connection only at the core network side; and the MME sending the data packet to be transmitted, to a Serving Gateway, SGW, over the PDN connection to instruct the SGW to send the data packet to be transmitted, to a Packet Data Gateway, PGW, over the PDN connection.

A user equipment includes:

a determining component configured, when there is data to be transmitted, to determine whether there is a Packet Data Network, PDN, connection established for transmitting the data; and a transmitting component configured to send to a Mobility Management Entity, MME, a data transmission message carrying a PDN Connectivity Request message and a data packet to be transmitted after it is determined that there is no PDN connection established for transmitting the data.

A Mobility Management Entity, MME, includes:

a message receiving component configured to receive a data transmission message, sent from a user equipment, carrying a Packet Data Network, PDN, Connectivity Request message and a data packet to be transmitted;

a connection establishing component configured to establish a PDN connection only at the core network side; and a data transmitting component configured to send the data packet to be transmitted to a Serving Gateway, SGW, over the PDN connection to instruct the SGW to send the data packet to be transmitted to a Packet Data Gateway, PGW, over the PDN connection.

A wireless communication system includes:

a user equipment configured to determine, when there is data to be transmitted, whether there is a Packet Data Network, PDN, connection established for transmitting the data; and to send to a Mobility Management Entity, MME, a data transmission message carrying a PDN Connectivity Request message and a data packet to be transmitted after determining that there is no PDN connection established for transmitting the data; and the MME configured to receive the data transmission message and establish a PDN connection only at the core network side; and to send the data packet to be transmitted, to a Serving Gateway, SGW, over the established PDN connection to instruct the SGW to send the data packet to be transmitted, to a Packet Data Gateway, PGW, over the PDN connection.

In the solution according to the embodiments of this application, when there is data to be transmitted at a user equipment and there is no PDN connection established for transmitting the data, the user equipment sends to an MME a data transmission message carrying a PDN Connectivity Request message and a data packet to be transmitted, and the MME receives the data transmission message and establishes a PDN connection only at the core network side and sends out the data packet to be transmitted over the PDN connection. As can be apparent, with this application, there is a solution of transmitting data by a UE for which no PDN connection has been established.

DETAILED DESCRIPTION

A small amount of data can be transmitted by carrying the data in a Non Access Stratum (NAS) message. An operation flow of a particular method thereof is as follows.

For Uplink Data:

Step 01. A UE negotiates with a Mobility Management Entity (MME) about the small data transfer feature in an Attach or Tracking Area Update (TAU) procedure, and the MME notifies a Serving Gateway (SGW) and a Packet Data Gateway (PGW) about the possibility of the UE to perform the small data transfer feature, and then the UE resumes a Radio Resource Control (RRC) Idle status;

Step 02. When an application layer of the UE needs to send an Internet Protocol (IP) data packet which will not trigger a plurality of downlink IP data packets, the application layer requests an NAS to encapsulate a new Initial NAS message carrying the IP data packet and an Evolved Packet System (EPS) bearer identifier (ID) and then send the encapsulated Initial NAS message to a base station (eNB); and if the application layer has a plurality of data packets to be sent, then a normal flow is performed;

Step 03. The eNB forwards the IP data packet in the Initial NAS message to the MME in an S1 interface Application (S1AP) initial message;

Step 04. The MME parses the Initial NAS message for the IP data packet, uses the EPS bearer ID to obtain an IP address of the UE and a Tunnel End Point Identifier (TEID) of the bearer, fills the IP address of the UE into a source address of the IP data packet, and then encapsulates the IP data packet into a GPRS Tunneling Protocol User (GTP-U) data packet and sends the GTP-U data packet to the SGW;

Step 05. The SGW parses the GTP-U data packet for the IP data packet and sends the IP data packet to the PGW, and the PGW forwards the IP data packet via an $SG_i$ interface;

Step 06. If the SGW has a downlink IP data packet (an acknowledgement data packet for the uplink IP data packet) arriving, then the SGW puts the downlink IP data packets into a Downlink Data Notification (DDN) message sent to the MME and also buffers the downlink IP data packet;

Step 07. If the length of the downlink IP data packet does not exceed a limitation by an operator or a subscription, then the MME sends the downlink IP data packet to the UE over an S1 interface Application (S1AP) connection; otherwise, the MME sends the downlink IP data packet to the UE by triggering a normal network initiated Service Request procedure;

Step 08. The MME notifies, in a Downlink Data Notification Acknowledgement (ACK) message, the SGW that the downlink IP data packet has been sent or the network initiated Service Request procedure has been triggered; and Step 09. If the Downlink Data Notification ACK received by the SGW does not indicate that the network initiated Service Request procedure has been triggered, then when there is a new downlink IP data packet arriving, the SGW continues with delivering the downlink IP data packet in the same way as described in steps 6 to 8, that is, the steps 6 to 8 are repeated.

For Downlink Data:

Step 11. The UE negotiates with the MME about the small data transfer feature;

Step 12. The SGW buffers a downlink IP data packet upon reception of the downlink IP data packet; and if the total length of the downlink IP data packet does not exceeds the limitation by the operator or the subscription, then the SGW puts the downlink IP data packet into a DDN message sent to the MME; otherwise, the SGW sends a DDN message carrying no downlink IP data packet to the MME; and the SGW further detects whether there is a subsequent data packet arriving;

Step 13. When the DDN message carries the downlink IP data packet, the MME decides from the subscription whether to use the small data transfer feature, and if the small data transfer feature is used, then the MME initiates paging to the UE by carrying a small data flag in a paging message and establishes a control plane connection with the UE after paging the UE; and Step 14. The MME encapsulates the EPS bearer ID and the downlink IP data packet in an S1 interface downlink Non Access Stratum (NAS) transport message and then sends the message to the eNB, and the eNB further sends the message to the UE.

It shall be noted that in the step 13, if the small data transfer feature is not used or the DDN message carries no downlink IP data packet, then the MME triggers a normal network initiated Service Request procedure, and subsequently the SGW sends the downlink IP data packet to the UE over a user plane connection with the UE established in the procedure.

As per the foregoing flow of transmission of uplink data, when the UE in an offline status needs to transmit a small amount of data, the UE needs to perform the following process:

Firstly the UE performs the Attach procedure and negotiates; and then transmits the small amount of data over the PDN connection established in the Attach procedure or reestablishes a PDN connection in response to a request of the application layer and transmits the small amount of data over the reestablished PDN connection; and finally the UE initiates a Detach procedure or a Locally Detach procedure.

The process has the following drawback: in fact, the user plane bearer of the UE has been established in the procedure of establishing the PDN connection, and it has been unnecessary to carry the small amount of data over the NAS. And after the data is transmitted, all the bearers will be removed, so the procedure of establishing the user plane bearer at the access network side has been wasted.

For the UE in an online status for which there is a small amount of data to be transmitted but no corresponding PDN connection has been established, the UE needs to perform the following process:

The UE transmit the small amount of data over a PDN connection established in the Attach procedure or reestablishes a PDN connection in response to a request of the application layer and transmits the small amount of data over the reestablished PDN connection.

The process has the following drawback: the UE needs to firstly establish a PDN connection, the user plane bearer has been established in the procedure of establishing the PDN connection, and thus it has been unnecessary to carry the small amount of data over the NAS.

As can be apparent, it has been a problem to be addressed of providing an optimized solution of transmitting data by a UE for which no PDN connection has been established. In view of this, an embodiment of this application provides a data transmission method, and in this method, when a user equipment needs to transmit data but does not establish a PDN connection with the network side, the user equipment sends to an MME a data transmission message carrying a PDN Connectivity Request message and a data packet to be transmitted, and the MME establishes a PDN connection at the core network side upon reception of the data transmission message and sends out the data packet to be transmitted over the PDN connection.

Figure 2:
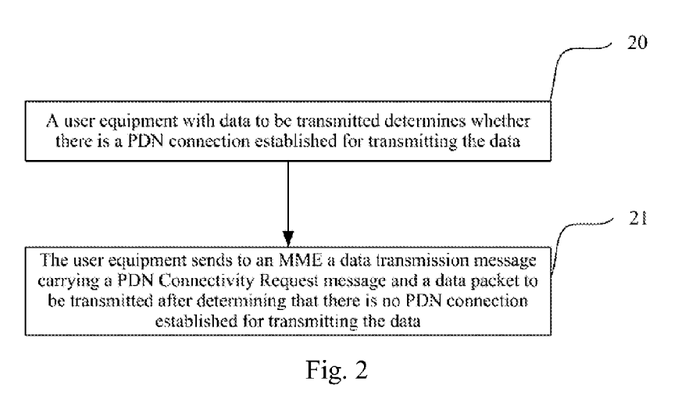
FIG. 2 is a schematic flow chart of a method according to an embodiment of this application.

Referring to FIG. 2, a data transmission method according to an embodiment of this application includes the following steps:

Step 20: A user equipment with data to be transmitted determines whether there is a PDN connection established for transmitting the data; and the user equipment in this application may be an MTC device or any device capable of data transmission with the network side.

Step 21: The user equipment sends to an MME a data transmission message carrying a PDN Connectivity Request message and a data packet to be transmitted after determining that there is no PDN connection established for transmitting the data, where the data packet to be transmitted carries the data to be transmitted.

Particularly when the user equipment is in an online status in the step 20, the data transmission message is an Initial Non Access Stratum (NAS) message. For example an ESM message container may be encapsulated in the Initial NAS message, and then the PDN Connectivity Request message is encapsulated in the ESM message container.

Furthermore before the step 20, the user equipment in an offline status may initiate an Attach procedure to the network side to thereby be attached to the network in the procedure.

Preferably the user equipment may negotiate with the MME about the small data transfer feature in the Attach procedure; or the user equipment initiates a Tracking Area Update (TAU) procedure to the network side after performing the Attach procedure and negotiates with the MME about the small data transfer feature in the TAU procedure.

Negotiation of the user equipment with the MME about the small data transfer feature in the prior art is described as follows:

During the Attach or TAU procedure, the UE and MME exchange information on their ability to support the "small data" procedures. The MME also obtains information (e.g. from the HSS) about the likelihood that this UE will predominately use (or not use) the small data transfer feature.

Particularly when the user equipment is in an offline status in the step 20, the data transmission message may be an Attach message. Furthermore the data transmission message may be the Attach message only if the user equipment stores a result of previous negotiation with the MME about the small data transfer feature or is configured with information about a support of the small data transfer feature.

Of course the data transmission message will not be limited to an Initial NAS message and an Attach message but can also be any other existing or newly defined message capable of carrying information.

In this application, the data packet to be transmitted at the user equipment may carry a small amount of data which refers to data with an amount of data below a preset amount of data.

Figure 3:
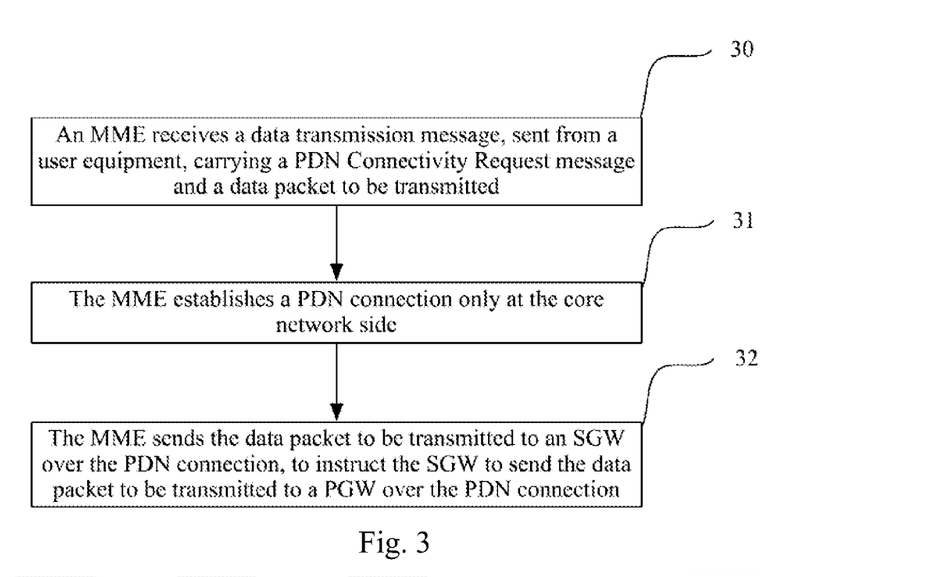
FIG. 3 is a schematic flow chart of another method according to an embodiment of this application.

Referring to FIG. 3, an embodiment of this application further provides a data transmission method including the following steps:

Step 30: An MME receives a data transmission message, sent from a user equipment, carrying a PDN Connectivity Request message and a data packet to be transmitted;

Step 31: The MME establishes a PDN connection only at the core network side without establishing a PDN connection at the access network side; and Step 32: The MME sends the data packet to be transmitted to an SGW over the PDN connection to instruct the SGW to send the data packet to be transmitted, to a PGW over the PDN connection. Subsequently the PGW routes out the received data packet to be transmitted.

In the step 31, the MME establishes the PDN connection at the core network side particularly as follows:

The MME sends a Create Session Request message to the PGW through the SGW; and then the MME receives a Create Session Response message of the PGW forwarded by the SGW after the PGW establishes an IP-CAN session, where the Create Session Response message carries a TEID and an IP address allocated for the user equipment. Reference can be made to the second step to the sixth step in FIG. 1 for details thereof Preferably after the MME establishes the PDN connection at the core network side and before the MME sends the data packet to be transmitted, to the SGW over the PDN connection, the MME may firstly encapsulate the data packet to be transmitted into a General Packet Radio System (GPRS) Tunneling Protocol User (GTP-U) data packet and then send the GTP-U data packet to the SGW over the PDN connection.

Preferably after the MME receives the data transmission message and before the MME establishes the PDN connection at the core network side, the MME may firstly determine from subscription information of the user equipment whether the small data transfer feature is applicable to the data packet to be transmitted, for examples, the MME determines whether the amount of data carried in the data packet to be transmitted is above an upper limit of the amount of data preset by a subscription or an operator, and if so, then the small data transfer feature is not applicable to the data packet to be transmitted; otherwise, the small data transfer feature is applicable. Then in the step 31, the MME establishes the PDN connection at the core network side after determining that the small data transfer feature is applicable to the data packet to be transmitted.

Preferably the MME may send an acknowledgement for the PDN Connectivity Request message to the user equipment after establishing the PDN connection at the core network side, where the acknowledgement message carries a bearer identifier corresponding to the PDN connection and an IP address allocated for the user equipment. For example, the acknowledgment message may be an Activate Default EPS Bearer Context Request message. The bearer identifier may be an EPS bearer ID of a default bearer of the PDN connection. Thus the user equipment may perform subsequent data transmission as in the prior art using the bearer identifier and the IP address carried in the acknowledgement message.

Preferably after the MME establishes the PDN connection at the core network side and before the MME sends the data packet to be transmitted, to the SGW over the PDN connection, the MME may firstly fill the IP address allocated for the user equipment into a source IP address of the data packet to be transmitted so that the data packet to be transmitted can be routed successfully to the destination; or Upon reception of the data packet to be transmitted, the PGW fills the IP address allocated for the user equipment into a source IP address of the data packet to be transmitted and sends out the data packet to be transmitted via an $SG_i$ interface.

This application will be described below in connection with particular embodiments.

First Embodiment

Figure 4A:
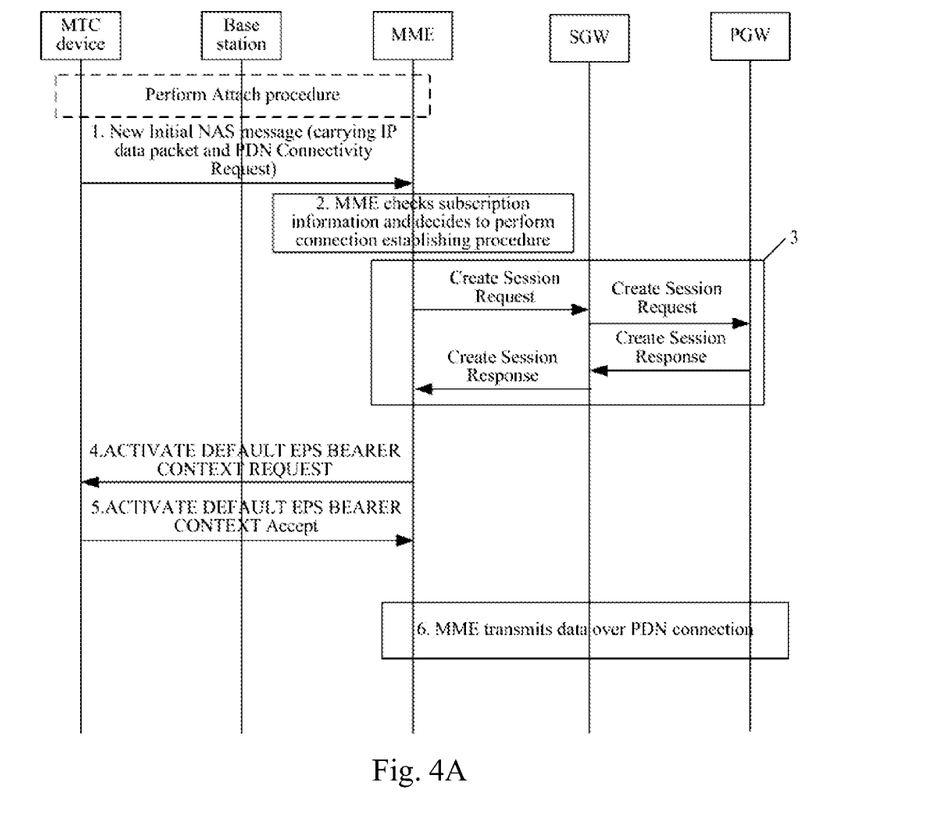
FIG. 4A is a schematic flow chart of a first embodiment of this application.

As illustrated in FIG. 4A, a particular flow is as follows:

Step 1. When an application layer of a UE in an online status has a small amount of data to be transmitted, if the UE currently has not established a corresponding PDN connection, then the UE requests an NAS to construct a new Initial NAS message in which an SM message container is encapsulated, where a PDN Connectivity Request message is encapsulated in the container; and the UE carries in the Initial NAS message an IP data packet including the small amount of data to be transmitted, and at this time, there is no EPS bearer ID to be filled with;

Step 2. An MME receives the Initial NAS message, and if it includes the PDN Connectivity Request message, then the MME determines from subscription information of the user equipment whether the small data transfer feature is applicable to the IP data packet in the Initial NAS message, and if not, then the MME rejects the PDN Connectivity Request, and the flow ends; or if so, then the MME proceeds to the step 3;

Step 3. The MME establishes a PDN connection at the core network side, that is, the MME performs the second step to the sixth step in FIG. 1;

Step 4. The MME sends an Activate Default EPS Bearer Context Request message to the UE as in the prior art to acknowledge the PDN Connectivity Request message, where the Activate Default EPS Bearer Context Request message carries a default bearer ID of the established PDN connection and an IP address allocated for the UE (the IP address of the UE is included in a Create Session Response message);

Step 5. The UE returns an Activate Default EPS Bearer Context Accept message to the MME;

Step 6. The MME parses the Initial NAS message for the IP data packet, fills the IP address of the UE into a source address of the IP data packet, and then encapsulates the IP data packet into a GTP-U data packet carrying a TEID corresponding to the established PDN connection and then sends the GTP-U data packet to the SGW in control signaling, and the SGW parses the control signaling for the GTP-U data packet and puts the GTP-U data packet onto a user plane bearer, and the user plane bearer forwards the GTP-U data packet to a PGW, and the PGW further routes out the IP data packet in the GTP-U data packet via an $SG_i$ interface; or The MME parses the Initial NAS message for the IP data packet, fills the IP address of the UE into a source address of the IP data packet, and then encapsulates the IP data packet into a GTP-U data packet carrying a TEID corresponding to the established PDN connection and then sends the GTP-U data packet to the SGW in control signaling, and the SGW forwards the control signaling carrying the GTP-U data packet to the PGW, and the PGW parses the control signaling for the IP data packet and routes out the IP data packet via an $SG_i$ interface; or The MME encapsulates the IP data packet in the Initial NAS message into a GTP-U data packet carrying a TEID corresponding to the established PDN connection as in the prior art and then sends the GTP-U data packet to the SGW in control signaling, and the SGW parses the control signaling for the GTP-U data packet and puts the GTP-U data packet onto a user plane bearer, and the user plane bearer forwards the GTP-U data packet to the PGW, and the PGW parses the GTP-U data packet for the IP data packet, and fills the IP address of the UE (the address of the UE is stored in the PGW in the prior art) into a source address of the IP data packet and then routes out the IP data packet via an $SG_i$ interface; or The MME encapsulates the IP data packet in the Initial NAS message into a GTP-U data packet carrying a TEID corresponding to the established PDN connection as in the prior art and then sends the GTP-U data packet to the SGW in control signaling, and the SGW forwards the control signaling carrying the GTP-U data packet to the PGW, and the PGW parses the control signaling for the IP data packet and fills the IP address of the UE (the address of the UE is stored in the PGW in the prior art) into a source address of the IP data packet and then routes out the IP data packet via an $SG_i$ interface.

Before the step 1, the UE in an offline status may firstly perform an Attach procedure with the MME to be attached to the network.

Second Embodiment

Figure 4B:
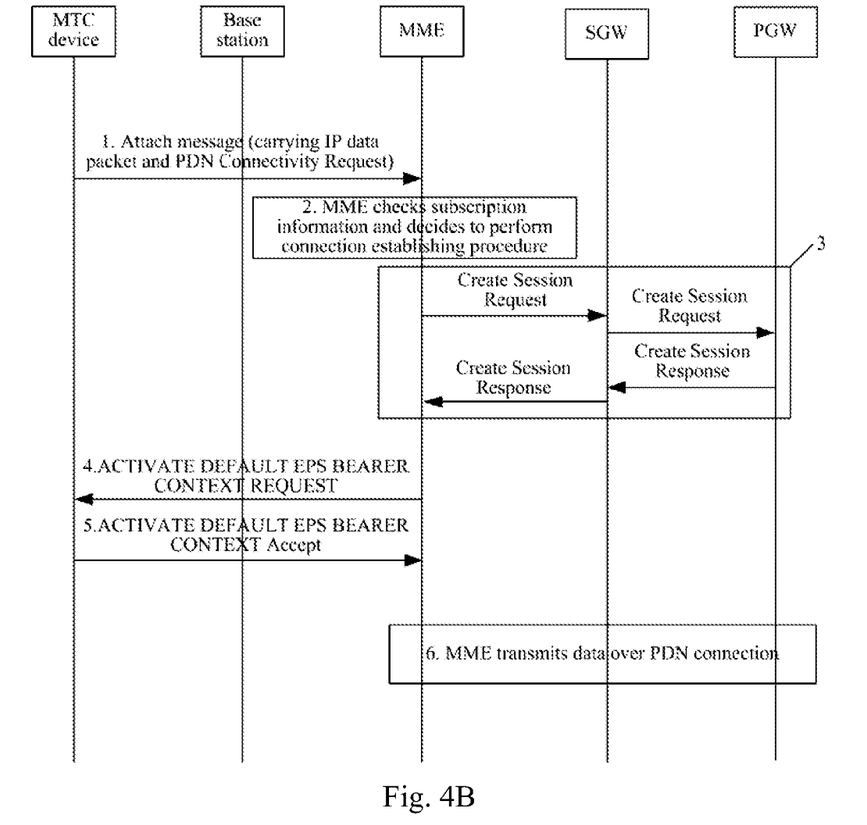
FIG. 4B is a schematic flow chart of a second embodiment of this application.

As illustrated in FIG. 4B, a particular flow is as follows:

Step 1. When an application layer of a UE in an offline status has a small amount of data to be transmitted, if the UE currently has not established a corresponding PDN connection, then the UE sends to the MME an Attach message in which an SM message container is encapsulated, where a PDN Connectivity Request message is encapsulated in the container; and the UE carries in the Attach message an IP data packet including the small amount of data to be transmitted;

Step 2. The MME receives the Attach message, and if it includes the PDN Connectivity Request message, then the MME determines from subscription information of the user equipment whether the small data transfer feature is applicable to the IP data packet in the Attach message, and if not, then the MME rejects the PDN Connectivity Request, and the flow ends; or if so, then the MME proceeds to the step 3;

Step 3. The MME establishes a PDN connection at the core network side, that is, the MME performs the second step to the sixth step in FIG. 1;

Step 4. The MME sends an Activate Default EPS Bearer Context Request message to the UE as in the prior art to acknowledge the PDN Connectivity Request message, where the Activate Default EPS Bearer Context Request message carries a default bearer ID of the established PDN connection and an IP address allocated for the UE (the IP address of the UE may be included in a Create Session Response message);

Step 5. The UE returns an Activate Default EPS Bearer Context Accept message to the MME;

Step 6. The MME parses the Attach message for the IP data packet, fills the IP address of the UE into a source address of the IP data packet, and then encapsulates the IP data packet into a GTP-U data packet carrying a TEID corresponding to the established PDN connection and then sends the GTP-U data packet to the SGW in control signaling, and the SGW parses the control signaling for the GTP-U data packet and puts the GTP-U data packet onto a user plane bearer, and the user plane bearer forwards the GTP-U data packet to a PGW, and the PGW further routes out the IP data packet in the GTP-U data packet via an $SG_i$ interface; or The MME parses the Attach message for the IP data packet, fills the IP address of the UE into a source address of the IP data packet, and then encapsulates the IP data packet into a GTP-U data packet carrying a TEID corresponding to the established PDN connection and then sends the GTP-U data packet to the SGW in control signaling, and the SGW forwards the control signaling carrying the GTP-U data packet to the PGW, and the PGW parses the control signaling for the IP data packet and routes out the IP data packet via an $SG_i$ interface; or The MME encapsulates the IP data packet in the Attach message into a GTP-U data packet carrying a TEID corresponding to the established PDN connection as in the prior art and then sends the GTP-U data packet to the SGW in control signaling, and the SGW parses the control signaling for the GTP-U data packet and puts the GTP-U data packet onto a user plane bearer, and the user plane bearer forwards the GTP-U data packet to the PGW, and the PGW parses the GTP-U data packet for the IP data packet, and fills the IP address of the UE (the address of the UE is stored in the PGW in the prior art) into a source address of the IP data packet and then routes out the IP data packet via an $SG_i$ interface; or The MME encapsulates the IP data packet in the Attach message into a GTP-U data packet carrying a TEID corresponding to the established PDN connection as in the prior art and then sends the GTP-U data packet to the SGW in control signaling, and the SGW forwards the control signaling carrying the GTP-U data packet to the PGW, and the PGW parses the control signaling for the IP data packet and fills the IP address of the UE (the address of the UE is stored in the PGW in the prior art) into a source address of the IP data packet and then routes out the IP data packet via an $SG_i$ interface.

The new Initial NAS message defined in this application may be as follows:

| IEI | Information Element | Type/ Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | message identity | Message type 9.8 | M | V | 1 |
| | Transmission type | xxxx | M | V | ½ |
| | NAS key set identifier | NAS key set identifier 9.9.3.21 | M | V | ½ |
| | EPS mobile identity | EPS mobile identity 9.9.3.12 | M | LV | 5-12 |
| | NAS PDU | xxxx | M | LV | xx-n |
| D- | Linked EPS bearer identity | Linked EPS bearer identity 9.9.4.6 | O | TV | 1 |
| 78 | ESM message container | ESM message container 9.9.3.15 | O | TLV-E | 6-n |

The foregoing Transmission Type may be defined as follows:

| 8 | 7 | 6 | 5 | 4 | 3 | 2 | 1 | |
|---|---|---|---|---|---|---|---|---|
| Transmission type IEI | | | | 0 Spare | | | Value | octet 1 |

| Transmission type value (octet 1) | |
|---|---|
| Bits | |
| 1 | |
| 0 | Transmission without PDN connection |
| 1 | Transmission using existing bearer |

Bit 2-4 of octet 1 is spare and shall be coded as zero.

Figure 5:
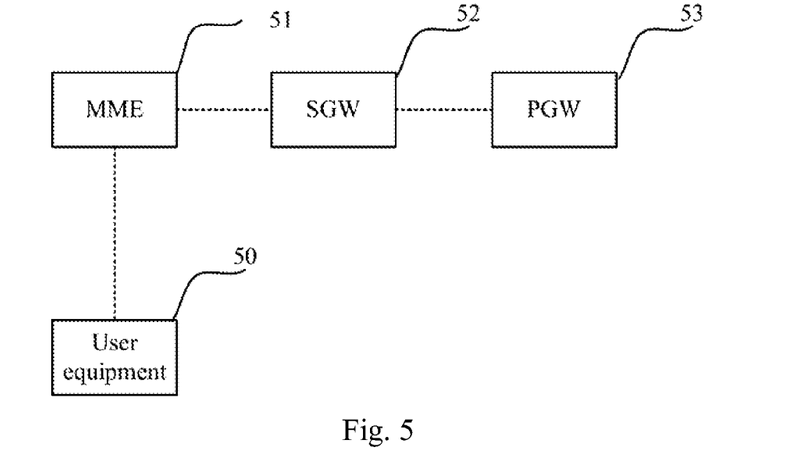
FIG. 5 is a schematic structural diagram of a system according to an embodiment of this application.

Referring to FIG. 5, an embodiment of this application further provides a wireless communication system including a user equipment and an MME.

The user equipment 50 is configured to determine, when there is data to be transmitted, whether there is a PDN connection established for transmitting the data; and to send to the MME a data transmission message carrying a PDN Connectivity Request message and a data packet to be transmitted after determining that there is no PDN connection established for transmitting the data, where the data packet to be transmitted carries the data to be transmitted; and The MME 51 is configured to receive the data transmission message and establish a PDN connection only at the core network side; and to send the data packet to be transmitted, to an SGW over the established PDN connection to instruct the SGW to send the data packet to be transmitted, to a PGW over the PDN connection.

The system may further include the SGW and the PGW.

The SGW 52 is configured to receive the data packet to be transmitted, sent from the MME and to send the data packet to be transmitted, to the PGW over the established PDN connection; and The PGW 53 is configured to receive the data packet to be transmitted, sent from the SGW and to send out the data packet to be transmitted.

Figure 6:
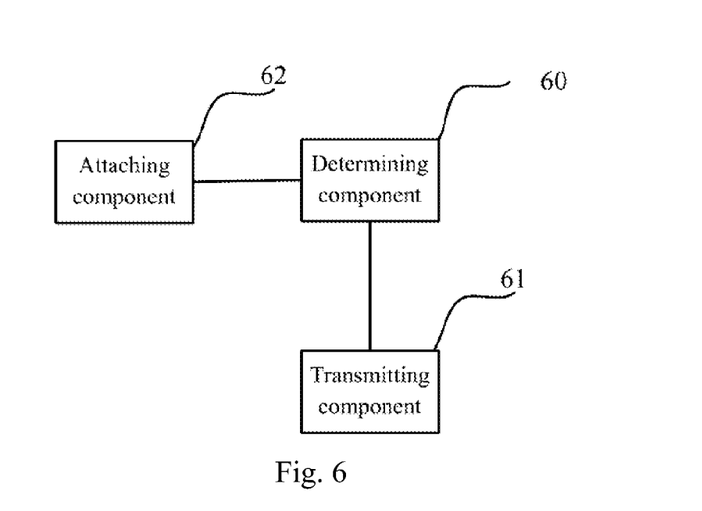
FIG. 6 is a schematic structural diagram of a user equipment according to an embodiment of this application.

Referring to FIG. 6, an embodiment of this application further provides a user equipment including a determining component and a transmitting component.

The determining component 60 is configured, when there is data to be transmitted, to determine whether there is a Packet Data Network (PDN) connection established for transmitting the data; and The transmitting component 61 is configured to send to a Mobility Management Entity (MME) a data transmission message carrying a PDN Connectivity Request message and a data packet to be transmitted after it is determined that there is no PDN connection established for transmitting the data.

When the user equipment is in an online status, the data transmission message is an Initial Non Access Stratum (NAS) message.

An ESM message container is encapsulated in the Initial NAS message, and the PDN Connectivity Request message is encapsulated in the EMS message container.

The user equipment further includes an attaching component.

The attaching component 62 is configured to initiate an Attach procedure to the network side when the user equipment is in an offline status and before the user equipment determines whether there is a PDN connection established for transmitting the data.

The attaching component 62 is further configured:

To negotiate with the MME about the small data transfer feature in the Attach procedure; or To initiate a Tracking Area Update (TAU) procedure to the network side after performing the Attach procedure and to negotiate with the MME about the small data transfer feature in the TAU procedure.

The data transmission message is an Attach message when the user equipment is in an offline status.

Furthermore the data transmission message may be the Attach message when the user equipment stores a result of previous negotiation with the MME about the small data transfer feature or is configured with information about a support of the small data transfer feature.

Figure 7:
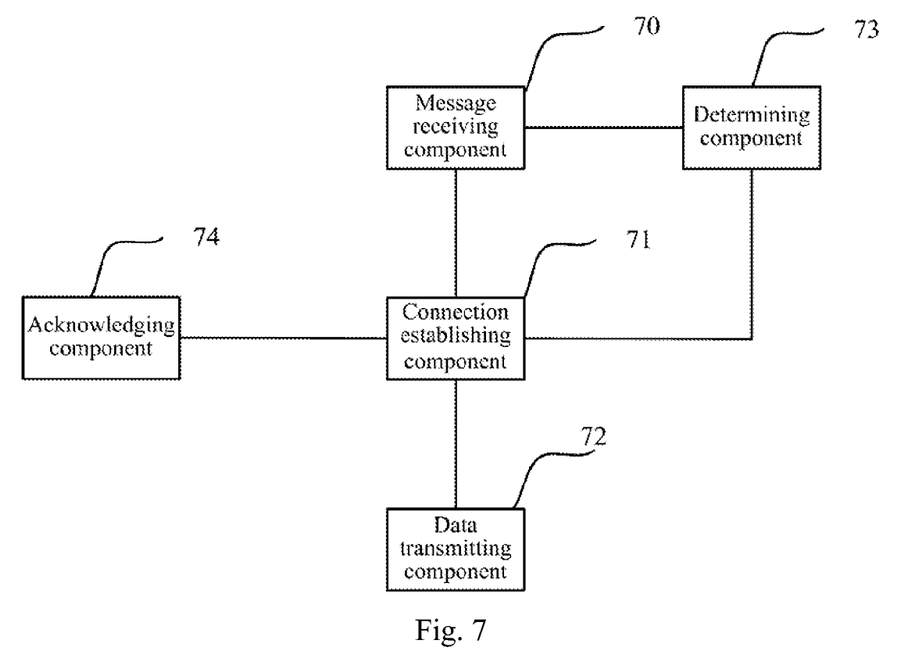
FIG. 7 is a schematic structural diagram of an MME according to an embodiment of this application.

Referring to FIG. 7, an embodiment of this application further provides an MME including a message receiving component, a connection establishing component, and a data transmitting component.

The message receiving component 70 is configured to receive a data transmission message, sent from a user equipment, carrying a PDN Connectivity Request message and a data packet to be transmitted;

The connection establishing component 71 is configured to establish a PDN connection only at the core network side; and The data transmitting component 72 is configured to send the data packet to be transmitted, to a Serving Gateway (SGW) over the PDN connection to instruct the SGW to send the data packet to be transmitted to a Packet Data Gateway (PGW) over the PDN connection.

The data transmitting component 72 is further configured:

To encapsulate the data packet to be transmitted into a General Packet Radio System (GPRS) Tunneling Protocol User (GTP-U) data packet after the PDN connection at the core network side is established and before the data packet to be transmitted is sent to the SGW over the PDN connection; and To send the GTP-U data packet to the SGW over the PDN connection.

The MME further include a determining component.

The determining component 73 is configured to determine from subscription information of the user equipment whether the small data transfer feature is applicable to the data packet to be transmitted after the data transmission message is received and before the PDN connection at the core network side is established; and The connection establishing component 71 is configured:

To establish the PDN connection at the core network side after it is determined that the small data transfer feature is applicable to the data packet to be transmitted.

The MME further include an acknowledging component.

The acknowledging component 74 is configured to send an acknowledgement for the PDN Connectivity Request message to the user equipment after the PDN connection at the core network side is established, where the acknowledgement message carries a bearer identifier of a default bearer of the PDN connection and an IP address allocated for the user equipment.

The acknowledgment message is an Activate Default EPS Bearer Context Request message.

The data transmitting component 72 is further configured:

To carry in the data packet to be transmitted the IP address allocated for the user equipment before sending the data packet to be transmitted, to the SGW over the PDN connection.

In summary, advantageous effects of this application include:

In the solution according to the embodiments of this application, a user equipment for which there is data to be transmitted and no PDN connection for transmitting the data has been established sends to an MME a data transmission message carrying a PDN Connectivity Request message and a data packet to be transmitted, and the MME receives the data transmission message and establishes a PDN connection only at the core network side and sends out the data packet to be transmitted over the PDN connection. As can be apparent, with this method, there is a solution of transmitting data by a UE for which no PDN connection has been established, and in this method, the UE will transmit the data without firstly establishing the PDN connection as in the flow illustrated in FIG. 1, thereby greatly lowering signaling consumption and improving the system efficiency.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A data transmission method comprising:
a Mobility Management Entity (MME) receiving a data transmission message, sent from a user equipment, carrying a Packet Data Network (PDN) Connectivity Request message and a data packet to be transmitted;
the MME establishing a PDN connection only at a core network side; and
the MME sending the data packet to be transmitted, to a Serving Gateway (SGW) over the PDN connection to instruct the SGW to send the data packet to be transmitted, to a Packet Data Gateway (PGW) over the PDN connection;
wherein after the MME receives the data transmission message and before the MME establishes the PDN connection at the core network side, the method further comprises:
the MME determining from subscription information of the user equipment whether a small data transfer feature is applicable to the data packet to be transmitted; and
wherein the MME establishing the PDN connection at the core network side comprises:

the MME establishing the PDN connection only at the core network side after the MME determines that the small data transfer feature is applicable to the data packet to be transmitted.

2. The method of claim 1, wherein after the MME establishes the PDN connection at the core network side and before the MME sends the data packet to be transmitted, to the SGW over the PDN connection, the method further comprises:
the MME filling an IP address allocated for the user equipment into a source IP address of the data packet to be transmitted; or
after the PGW receives the data packet to be transmitted, the method further comprises: the PGW filling an IP address allocated for the user equipment into a source IP address of the data packet to be transmitted and sending out the data packet to be transmitted via an $SG_i$ interface.

3. The method of claim 1, wherein after the MME establishes the PDN connection at the core network side and before the MME sends the data packet to be transmitted, to the SGW over the PDN connection, the method further comprises:
the MME encapsulating the data packet to be transmitted into a General Packet Radio System, GPRS, Tunneling Protocol User, GTP-U, data packet; and
the MME sending the data packet to be transmitted, to the SGW over the PDN connection comprises: the MME sending the GTP-U data packet to the SGW over the PDN connection.

4. The method of claim 1, wherein after the MME establishes the PDN connection at the core network side, the method further comprises:
the MME sending an acknowledgement for the PDN Connectivity Request message to the user equipment, wherein the acknowledgement message carries a bearer identifier of a default bearer of the PDN connection and an IP address allocated for the user equipment.

5. The method of claim 4, wherein the acknowledgment message is an Activate Default Evolved Packet System, EPS, Bearer Context Request message.

6. A Mobility Management Entity (MME) comprising:
a receiver configured to receive a data transmission message, sent from a user equipment, carrying a Packet Data Network (PDN) Connectivity Request message and a data packet to be transmitted;
a processor configured to establish a PDN connection only at a core network side; and
a transmitter configured to send the data packet to be transmitted, to a Serving Gateway (SGW) over the PDN connection to instruct the SGW to send the data packet to be transmitted to a Packet Data Gateway (PGW) over the PDN connection;
wherein the processor is further configured to determine from subscription information of the user equipment whether a small data transfer feature is applicable to the data packet to be transmitted after the data transmission message is received and before the PDN connection at the core network side is established, and wherein the processor is further configured to establish the PDN connection at the core network side after it is determined that the small data transfer feature is applicable to the data packet to be transmitted.

7. The MME of claim 6, wherein the transmitter is further configured:
to encapsulate the data packet to be transmitted into a General Packet Radio System, GPRS, Tunneling Protocol User, GTP-U, data packet after the PDN connection at the core network side is established and before the data packet to be transmitted is sent to the SGW over the PDN connection; and
to send the GTP-U data packet to the SGW over the PDN connection.

8. The MME of claim 7, wherein the transmitter is further configured:
to carry in the data packet to be transmitted an IP address allocated for the user equipment before sending the data packet to be transmitted, to the SGW over the PDN connection.

9. The MME of claim 6, wherein the transmitter is further configured:
to send an acknowledgement for the PDN Connectivity Request message to the user equipment after the PDN connection at the core network side is established, wherein the acknowledgement message carries a bearer identifier of a default bearer of the PDN connection and an IP address allocated for the user equipment.

10. The MME of claim 9, wherein the transmitter is further configured:
to carry in the data packet to be transmitted an IP address allocated for the user equipment before sending the data packet to be transmitted, to the SGW over the PDN connection.

11. The MME of claim 9, wherein the acknowledgment message is an Activate Default Evolved Packet System, EPS, Bearer Context Request message.

12. The MME of claim 11, wherein the transmitter is further configured:
to carry in the data packet to be transmitted an IP address allocated for the user equipment before sending the data packet to be transmitted, to the SGW over the PDN connection.

13. The MME of claim 6, wherein the transmitter is further configured:
to carry in the data packet to be transmitted an IP address allocated for the user equipment before sending the data packet to be transmitted, to the SGW over the PDN connection.

14. The MME of claim 6, wherein the transmitter is further configured:
to carry in the data packet to be transmitted an IP address allocated for the user equipment before sending the data packet to be transmitted, to the SGW over the PDN connection.

15. A wireless communication system comprising:
a user equipment configured to determine, when there is data to be transmitted, whether there is a Packet Data Network (PDN) connection established for transmitting the data; and to send to a Mobility Management Entity (MME) a data transmission message carrying a PDN Connectivity Request message and a data packet to be transmitted after determining that there is no PDN connection established for transmitting the data; and
the MME configured to receive the data transmission message and establish a PDN connection only at the core network side, and to send the data packet to be transmitted, to a Serving Gateway (SGW) over the established PDN connection to instruct the SGW to send the data packet to be transmitted, to a Packet Data Gateway (PGW) over the PDN connection;
wherein after the MME receives the data transmission message and before the MME establishes the PDN connection at the core network side, the MME is configured to determine from subscription information of the user equipment whether a small data transfer feature is applicable to the data packet to be transmitted, and
wherein the MME is further configured to establish the PDN connection only at the core network side after the MME determines that the small data transfer feature is applicable to the data packet to be transmitted.

* * * * *